United States Patent [19]

Lerner et al.

[11] 4,111,337

[45] Sep. 5, 1978

[54] COFFEE BREWER WITH MEANS FOR DISPENSING CONTROLLED QUANTITIES OF HOT WATER

[76] Inventors: Edward Lerner, 3 Marshall St., Irvington, N.J. 07111; John A. Ventura, 32 Jefferson St., Nutley, N.J. 07110

[21] Appl. No.: 532,366

[22] Filed: Dec. 13, 1974

[51] Int. Cl.² ............................................. B67D 5/62
[52] U.S. Cl. .............................. 222/146 HE; 222/416
[58] Field of Search ........ 222/146 R, 146 H, 146 HE, 222/416

[56] References Cited

U.S. PATENT DOCUMENTS

| | | | |
|---|---|---|---|
| 3,143,636 | 8/1964 | Lupovici | 222/146 HE |
| 3,220,334 | 11/1965 | Martin | 222/146 HE |
| 3,835,295 | 9/1974 | Ronchese | 222/146 HE |

FOREIGN PATENT DOCUMENTS 1,129,727  10/1968  United Kingdom ............ 222/146 HE Primary Examiner—Allen N. Knowles
Attorney, Agent, or Firm—Carella, Bain, Gilfillan & Rhodes

[57] ABSTRACT

A coffee brewer with means for dispensing controlled quantities of hot water comprising a water tank, means for heating the water in the tank, water inlet means connected to the tank, a water discharge siphon connected at one end to the tank, the opposite end of the siphon being at a level beneath the first said end thereof, a water reservoir, a supply conduit connecting the reservoir to the water tank, the end of the supply conduit in the tank being positioned beneath the level of the end of the siphon in the tank, the said reservoir being closed except for said supply conduit and being positioned for gravity discharge into said water tank, a water discharge conduit connected at one end to the tank beneath the level of the end of said supply conduit therein, and valve means in the said discharge conduit.

3 Claims, 2 Drawing Figures

COFFEE BREWER WITH MEANS FOR DISPENSING CONTROLLED QUANTITIES OF HOT WATER

BACKGROUND OF THE INVENTION

A wide variety of coffee brewing devices are well known in the art. One such device comprises a housing for a water tank, the tank having an inlet in the top thereof. The tank is also provided with a siphon extending generally from the top thereof to a position above a coffee brewing pot.

The water tank is also provided with water heating means, preferably a calrod heater positioned within the tank. Additionally, a tube is connected to the water inlet in the top of the tank and extends downwardly towards the bottom thereof.

In operation, water is introduced into a topmost chamber connected to the inlet to the water tank flowing downwardly through the tube toward the bottom of the tank being discharged therewithin. When the water within the receiving chamber rises to a level sufficient to force the water in the tank to the top of the siphon, siphoning action ensues discharging water from the tank equal in volume to the water added to the said chamber. Because the cold make-up water passes downwardly through the internal tube connected to the inlet to the bottom of the tank and because of natural convection, pre-heated water in the tank is siphoned off passing from the end of the siphon into a filter bearing funnel containing coffee passing therethrough into a coffee pot.

Because of the siphon action above described, such coffee brewers are generally adapted only for the discharge of a pot of coffee for fresh brewing. They are not adapted for the discharge of smaller quantities of hot water for use as make-up for tea, soups, hot chocolate or other beverages or liquid foods.

Therefore, there is great need in the art for a coffee brewer which provides means for dispensing relatively small, limited, but controlled quantities of hot water without resort to or accidentally initiating the siphon action above described.

Therefore, it is among the objects and advantages of the present invention to provide a coffee brewer with means for dispensing controlled but limited quantities of hot water.

Another object of the present invention is to provide a coffee brewer which combines the usual siphon for brewing relatively large quantities of coffee with a water supply reservoir for the discharge of lesser but controlled quantities of hot water from a separate discharge conduit.

Still another object of the present invention is to provide a coffee brewer with means for dispensing controlled but limited quantities of hot water in which make-up water from a separate reservoir is supplied in the quantity withdrawn without resort to mechanical valves between the reservoir and a water heating tank from which the water is withdrawn.

SUMMARY OF INVENTION

A coffee brewer with means for sensing controlled quantities of hot water comprising a water tank, means for heating water in the tank, water inlet means connected to the tank, a water discharge siphon connected at one end to the tank, the opposite end of the siphon being at a level beneath the first said end thereof, a water reservoir, a supply conduit connecting the reservoir to the water tank, the end of the supply conduit in the tank being in this position beneath the level of the end of the siphon in the tank, the said reservoir being closed except for said supply conduit and being positioned for gravity discharge into said water tank, a water discharge conduit connected at one end to the tank beneath the level of the end of said supply conduit therein, and valve means in the said discharge conduit.

PREFERRED EMBODIMENT OF INVENTION

The objects and advantages aforesaid as well as other objects and advantages may be achieved by the coffee brewer with means for dispensing controlled but limited quantites of hot water illustrated in the drawings in which.

Figure 1:
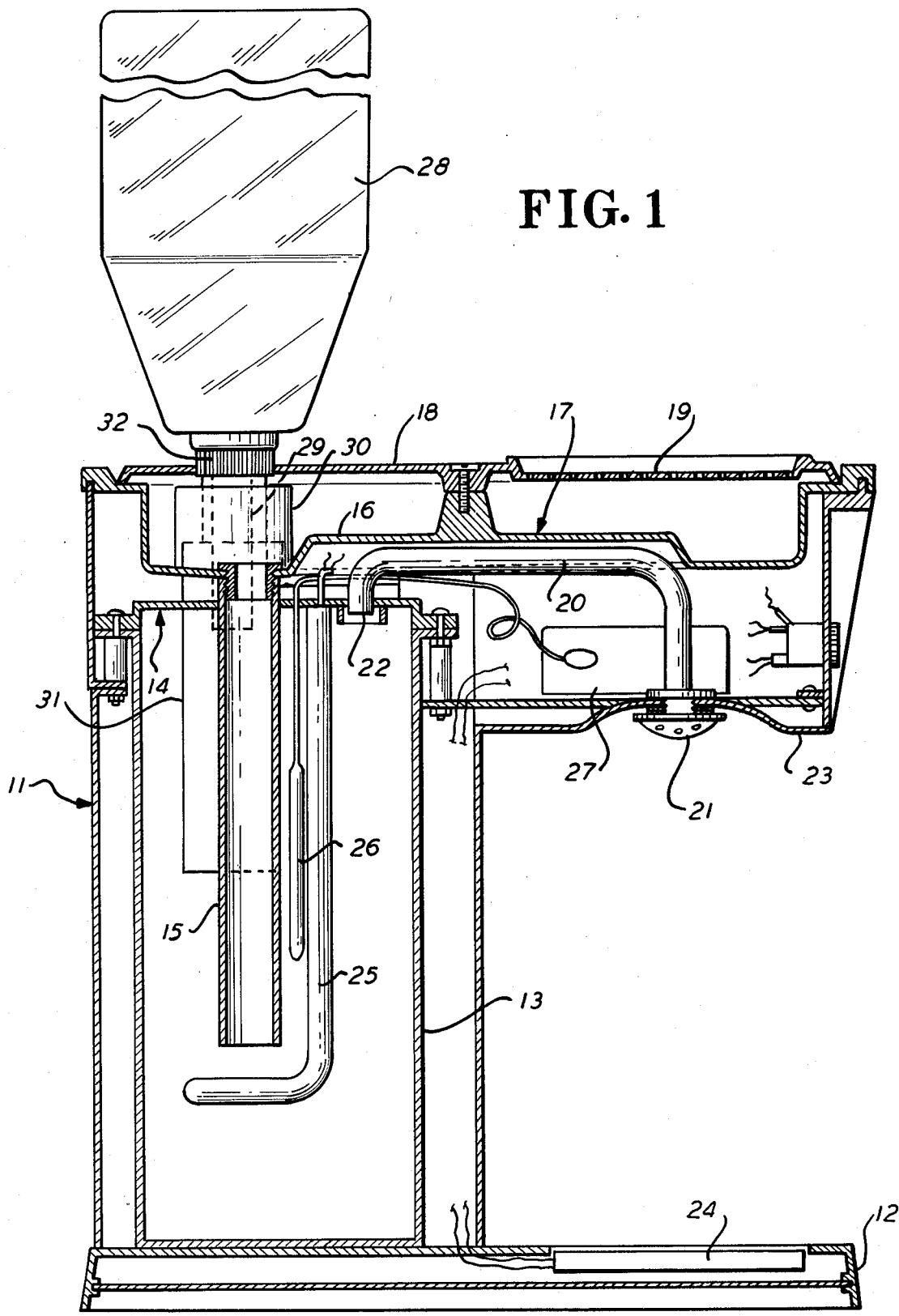
FIG. 1 is side elevational cross-sectional view of a preferred embodiment of the coffee brewer.

Referring now to the drawings in detail, coffee brewer comprises a common, well known coffee brewing device having a housing 11 mounted on a pedestal 12. A water tank 13 is mounted within the housing 11 on the pedestal 12. The water tank 13 is provided with a top cover 14 through which a water inlet conduit 15 extends depending downwardly toward the bottom of the tank 13. The water inlet conduit 15 extends upwardly through the top 14 of the tank 13 connecting to the bottom 16 of a water receiving tray 17 which is positioned above the water tank 13. The tray 17 is provided with a cover 18 which functions as a cover to the housing 11. The cover 18 is provided with an opening 19 which is preferably an open grill for the introduction of water into the tray 17 and from thence downwardly through conduit 15 into the water tank 13.

A siphon 20 is connected at one end through the top 14 of the water tank 13. The discharge end 21 of the siphon 20 is positioned at a level beneath the inlet end 22 thereof. The discharge end 21 of the siphon 20 depends downwardly through a horizontally extending portion 23 of the housing 11 and above a portion of the pedestal 12 containing an electrically energized heating plate 24.

The water tank 13 is also provided with electrical heating means preferably a calrod heater 25. Additionally a heat sensing probe 26 is positioned within water tank 13 and is electrically connected to either a preset or manually set control 27 which energizes and de-energizes the heater 25.

The above-described coffee brewing apparatus is well known. In operation, water introduced through opening 19 flows into tray 17 and from thence through conduit 15 into the water tank 13. The level of water in tank 13 arises until the crest of the siphon 20 is reached whereupon a siphoning action ensues with water passing through siphon 20 to a coffee pot where coffee can be brewed. Because of the siphoning action, the quantity of water discharged from the tank 13 will be equal to the quantity of water introduced into the tray 17 assuming of course that the tank were initially substantially full. When the level of water falls below the inlet end 22 of the siphon 20, the siphoning action is broken and the flow of water ceases.

Because fresh water introduced into the tray 17 is discharged through conduit 15 near the bottom of the tank 13, and because normal convection causes hot water to rise, the initial portion of water discharged will be hot. The tank 13 is dimensioned with respect to the usual quantity of water necessary to brew a pot of coffee such that the mean temperature of the water discharged therefrom is sufficiently hot.

In order to provide means for the discharge of controlled but limited quantities of hot water without resort to the siphon 20, a water reservoir 28 is mounted on the cover 18 over the tray 17. A discharge conduit 29 depends from the bottom of the reservoir 28 downwardly through the top 14 of the water tank 13. A pair of telescoping conduits 30 and 31 which extend through the top 14 of the water tank 13 and the bottom 16 of the tray 17 are employed to deposit the water from reservoir 28 deeply into tank 14. A notch 37 in the top of conduit 30 at the neck 32 of the reservoir 28 provides for air relief from conduits 30 and 31.

The bottom or discharge end of the conduit 29 connected to the reservoir 28 is positioned at a level beneath that of the end 22 of the siphon 20.

A hot water discharge conduit 33 is connected to the side 34 of the tank 13 extending outwardly through the housing 11 to a valve 35. The valve 35 is manually operated by lever 36 for the withdrawal of desired quantities of hot water.

Figure 2:
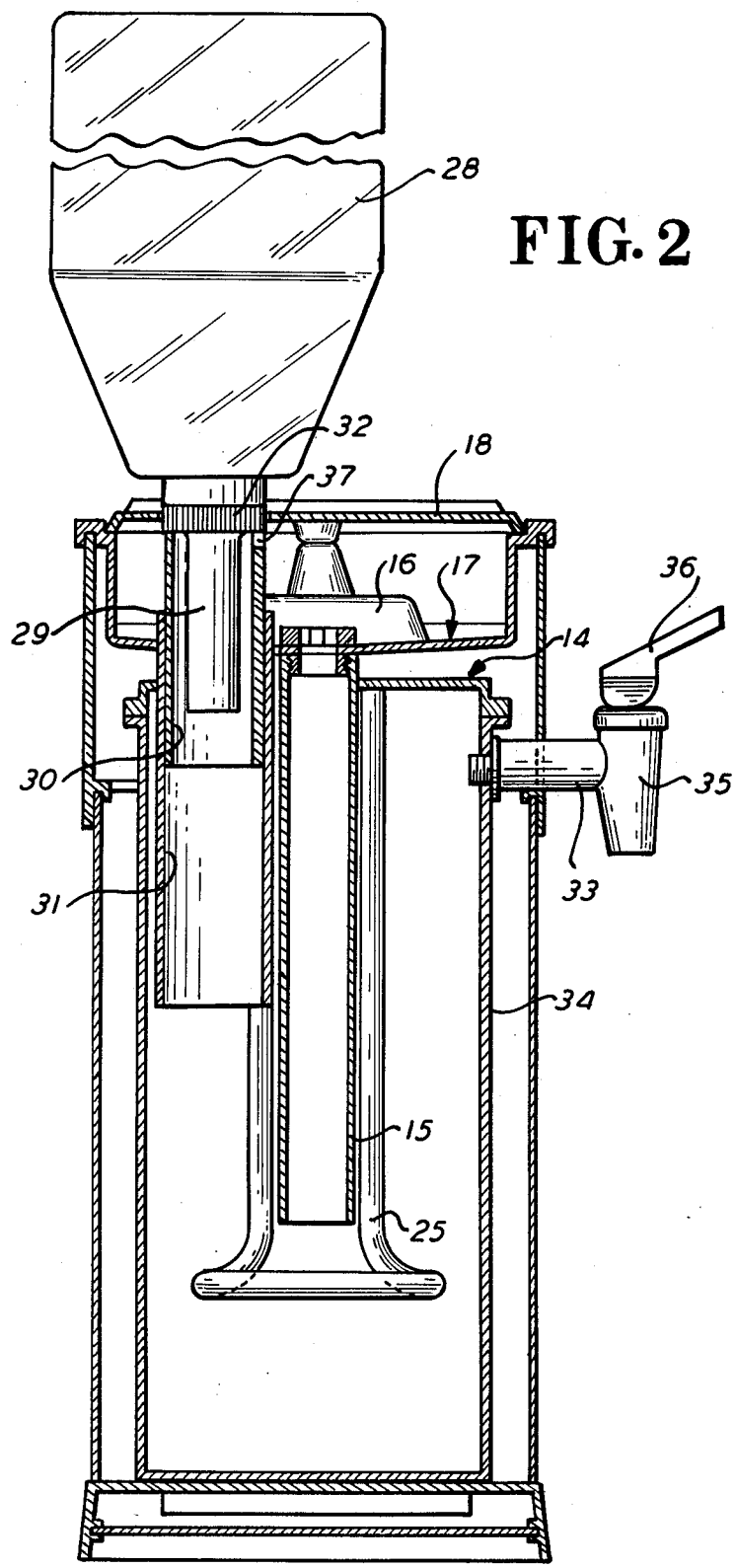
FIG. 2 is an end elevational cross-sectional view of the coffee brewer shown in FIG. 1 taken along lines 2—2 therein.

In operation the reservoir 28 is filled with water and positioned as illustrated in FIGS. 1 and 2 with the discharge conduit 29 extending downwardly into the water tank 13. When the level of the water in tank 13 covers the bottom end of the discharge conduit 29 the flow of water from the reservoir 28 terminates because of an airlock, the reservoir 28 being closed. Because the level of the bottom end of the conduit 29 is beneath the level of the bottom 22 of the siphon 20, no water siphons from the tank from the reservoir 28. However, when valve 35 is opened to withdraw water from the tank 13, the level therein drops beneath the bottom of discharge conduit 29 connected to reservoir 28 resulting in a flow of water from reservoir 28 equal in volume to the volume of water withdrawn through conduit 33. When valve 35 is closed, water will cease passing from reservoir 28 into tank 13 when the level of the water in tank 13 rises slightly above the bottom end of the discharge conduit 29.

Preferably, the conduit 33 is positioned at a level generally proximal to the top of the tank 13 so as to insure the withdrawal of hot water. Cold water from the reservoir 28 first passes downwardly into the water tank 13 through conduit 31 thus insuring that the cold water will not tend to pass outwardly through the valve 35. The bottom of conduit 31 should be sufficiently far beneath the level of conduit 33 to insure that the mean temperature of water withdrawn through conduit 33 is near that of the ambient temperature of the water in tank 13.

What is claimed is:

1. A coffee brewer with means for dispensing controlled quantities of hot water comprising:
    (a) a first water tank,
    (b) means for heating water in the tank,
    (c) water inlet means connected to the tank,
    (d) a water discharge conduit connected at one end to the tank, the opposite end of the conduit being at a level beneath the first said end thereof,
    (e) a second water tank,
    (f) a supply conduit separate from said water inlet means, said supply conduit connecting the first and second said water tanks, the end of the supply conduit in the first water tank being at a level beneath the level of the end of the conduit in the said first water tank,
    (g) The second water tank being closed except for said supply conduit and being positioned for gravity discharge into the said first water tank,
    (h) a discharge conduit connected at one end to the first tank beneath the level of the end of the conduit therein,
    (i) valve means operatively connected to the discharge conduit,
    (j) a second supply conduit, the first said supply conduit extending therethrough, the second supply conduit extending downwardly into the first said tank to a level beneath the end of the first said supply conduit, and
    (k) air vent means in the second supply conduit above the level of the end of the first supply conduit in the first water tank.

2. A coffee brewer with means for dispensing controlled quantities of hot water comprising:
    (a) the structure in accordance with claim 1 in which
    (b) the level of the end of the said second supply conduit is beneath the level of the end of the discharge conduit connected to the said first tank.

3. A coffee brewer with means for dispensing controlled quantities of hot water comprising:
    (a) the structure in accordance with claim 2 in which
    (b) the level of the end of the said second supply conduit is sufficiently beneath the level of the end of the discharge conduit connected to the said first tank such that the temperature of water withdrawn in desired quantities through the discharge conduit will not be significantly depressed beneath the ambient temperature of water in the first said tank.

* * * * *